United States Patent [19]

Solhjell

[11] Patent Number: 5,621,436
[45] Date of Patent: Apr. 15, 1997

[54] KEYBOARD WITH INTEGRATED MOUSE FOR DATA ENTRY AND CONTROL

[75] Inventor: Erik Solhjell, Oslo, Norway

[73] Assignee: Tandberg Data Storage AS, Oslo, Norway

[21] Appl. No.: 717,936

[22] Filed: Jun. 20, 1991

[51] Int. Cl.[6] .................................................. G09G 5/08
[52] U.S. Cl. ........................... 345/163; 345/167; 345/168
[58] Field of Search ................................. 340/706, 709, 340/710; 178/18; 341/21, 22; 400/486, 488; 345/156, 163, 167, 168; 364/709.12

[56] References Cited

U.S. PATENT DOCUMENTS

| | | | |
|---|---|---|---|
| 4,404,865 | 9/1983 | Kim | 340/710 |
| 4,818,978 | 4/1989 | Kurihara et al. | 340/706 |
| 4,913,387 | 4/1990 | Tice | 340/709 |
| 4,931,781 | 6/1990 | Miyakawa | 340/706 |
| 4,977,397 | 12/1990 | Kuo et al. | 340/710 |
| 5,021,771 | 6/1991 | Lachman | 340/711 |
| 5,088,070 | 2/1992 | Shiff | 340/706 |
| 5,119,078 | 6/1992 | Grant | 340/706 |
| 5,160,919 | 11/1992 | Mohler et al. | 340/711 |

FOREIGN PATENT DOCUMENTS

| | | | |
|---|---|---|---|
| 2221016 | 1/1990 | United Kingdom | 74/471 XY |

OTHER PUBLICATIONS

"England cursor key with trackball" IBM Technical disclosure Bulletin, vol. 33, No. 9, Feb. 1991. pp. 428–430.

*Primary Examiner*—Richard Hjerpe
*Assistant Examiner*—Amare Mengistu
*Attorney, Agent, or Firm*—Hill, Steadman & Simpson

[57] ABSTRACT

A computer keyboard mouse system wherein a mouse assembly is integrated into a front or side wall of a keyboard of the computer. A control ball of the mouse assembly protrudes from the front or side wall for control by the operator. To protect against forces directed against the ball of the mouse assembly which could damage it, a ball retaining member is spring loaded such that excessive forces to be protected against will cause the ball to be pushed into the front or side wall. Mouse control keys may be provided adjacent to the mouse assembly on the front or side wall. Also, the control keys can be one or more designated keys of the keyboard itself.

3 Claims, 3 Drawing Sheets

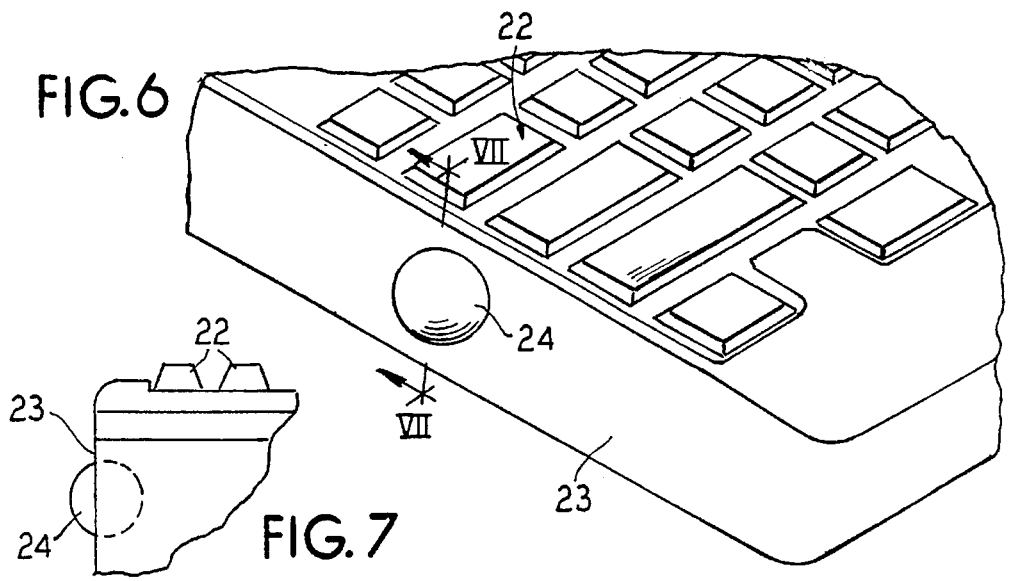
FIG. 6
FIG. 7
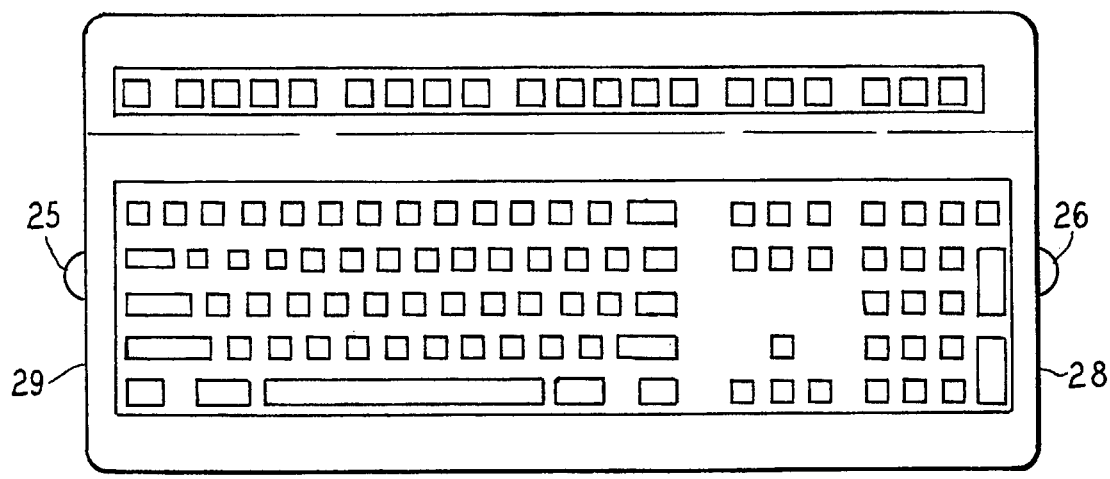
FIG. 8
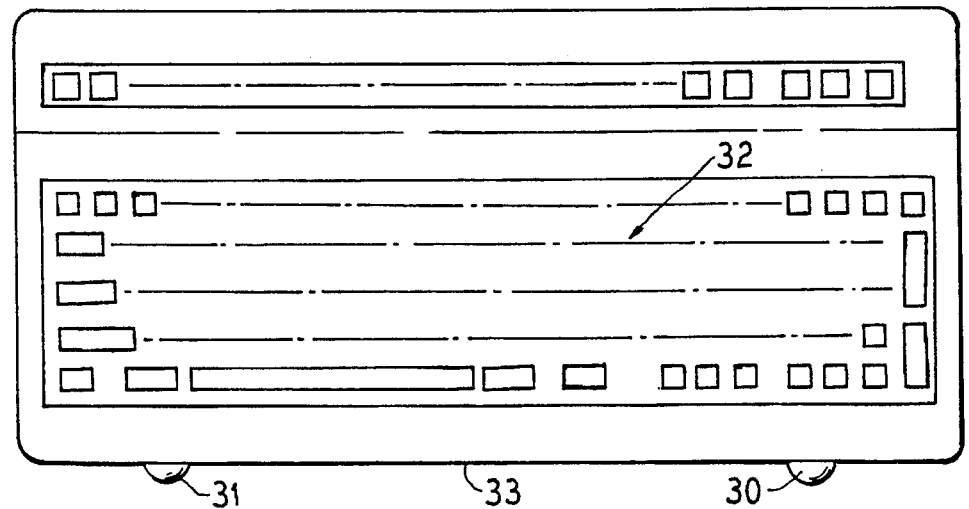
FIG. 9

KEYBOARD WITH INTEGRATED MOUSE FOR DATA ENTRY AND CONTROL

BACKGROUND OF THE INVENTION

The invention relates to a mouse used in conjunction with portable computers.

A keyboard is normally used to enter data manually into a computer system. These keyboards can be made in many different versions. However, they are all designed around the same basic concept: the keyboard contains groups of "Keys", each assigned to a specific letter or number, or one or more signs. Additionally, most modern keyboards for data systems also contain a series of function keys. Each function key may activate a special operation, depending upon the program being executed in the computer.

To simplify operations, many data systems and computer programs are also designed to work with a "mouse" in addition to the keyboard. Although these mice may take many forms, their basic functions are the same: a unit containing a ball and one or more keys which may be pressed down. Two types of ball systems exist, as described hereafter.

In the first type, the ball is mounted on the bottomside of the mouse housing. Moving the mouse by rolling the mouse housing along a table will make the ball roll. This rolling ball operation is transferred to a corresponding movement of the cursor on the data screen of the connected computer. The ball operation can be translated into a distance and direction moved along an x-axis and a distance and direction moved along a y-axis. This movement is then transferred to the computer which moves the cursor on the screen in directions and distance corresponding to those given by the mouse movement. In most programs, the relationship between a given rolling distance of the mouse ball and the corresponding movement of the cursor can be programmed. Also, the acceleration of the mouse operation can be programmed.

The second type of mouse design differs since the ball is on the top of the mouse housing. Again the mouse housing can be moved, but the basic operation is performed by having the mouse rest fairly permanently. The ball is moved by rolling it with the hand. This again will correspond to a movement of the cursor as described above.

This second type of mouse was previously often referred to as a "Trackball." These days, the word mouse is more commonly used also for this type, and will therefore be used in the rest of this text.

Both mouse designs therefore operate the cursor in the same way, the difference between the designs being related to the movement of the ball. Both versions typically have one or more keys 6, 7 as shown in FIG. 1, or 8, 9 as shown in FIG. 4, which the operator may activate in addition to the operation of the ball. Depending upon the computer program, the operation of the ball together with the pressing of one or more keys will create specified operations or reactions by the computer program.

Although mouse operations may increase an operator's efficiency, the mouse also poses some problems. Mice designed to be moved along a table (roller ball on bottom), may require a fairly substantial table area. In some computer areas, this may cause problems. Also, the operator has to move his or her arm away from the keyboard area, which may slow down the overall efficiency and create muscle problems.

The other mouse type with the roller ball on the top does not require a large additional table area for its operation. However, both types of mice may not be suitable for computer systems designed to be moved around easily.

FIGS. 1 and 2 generally show at 10 a typical mouse design with a ball 11 on the underside of a mouse housing 12. For simplicity, this is referred to as "Type 1" in the following text. FIGS. 3 and 4 show a mouse 13 with a ball 14 on the top side of a housing 15. This will be referred to as "Type 2" in the following text.

When the ball on a mouse of type 2 is rolled by the hand of the operator, the ball movement is transferred to an "x-" and a "y-" control system internally in the mouse housing. Although this control system may vary in design, the basic principle is to register the movement of the ball on an x and y axis. Typically the ball 19 is touching three or four rollers, such as shown in FIG. 5 at 16, 17, and 18, where one or two are freerolling (such as 18) and the other two (such as 16 and 17) are connected to systems via measuring devices 20 or 21 for detecting the direction of the revolution of the roller and the length of rolling, as shown in FIG. 3. One of these detection rollers is referred to as the x-axis controller 16, the other one (90 degrees off the x axis roller 16) is referred to as the y-axis controller 11. The free roller is shown at 18 (see FIG. 3). The two rollers 16 and 17 work independently. The direction and movement of the x- and y- controllers are transferred to the cursor on the data screen of the connected data system. Most programs permit the ratio between the movement of the ball in the x-direction and the y-direction, and the corresponding movement of the cursor in the same directions, to be set to suit the specific taste and requirements of the operator.

The type 1 mouse operates in the same way, except that the ball is on the bottom side and the ball is rolling by moving the mouse along the table.

The extra mouse keys which may be pressed down by the operator are used to mark special cursor locations, start and stop of a cursor movement etc. This will vary depending upon the program being run. Typically, a mouse may have two or three keys in addition to the ball. More than three keys are normally not practical.

For computers designed to be easily moved around ("laptop" computers, "Notebook" computers, etc.), the available area for the keyboard is very often limited. Therefore, the designers of these computers are normally trying to utilize as much as possible of the available area for the keys.

As programs designed for mouse operation become more and more popular, many different designs have been tried out in order to also allow these kinds of computers to efficiently utilize a mouse. The normal type 1 mouse with the ball on the bottom side and designed to be rolled along a table, is normally not very practical for these types of computers. Mouse of type 2 is better, as it requires no movement of the whole mouse assembly. But it still requires additional space, which not always is readily available.

Some designs have been tried where the mouse (type 2) is integrated into the keyboard itself, among the keys on the top of the keyboard. This, however, takes up valuable space which could have been used for the keys.

Another design allows a mouse of type 2 to be hooked onto the side of the keyboard. Although it does not take up space on the keyboard itself, it does increase the total area required for the computer, and it requires, of course, the computer owner to carry this kind of mouse with him in addition to the computer itself.

There also exists a design wherein a special roller on the top of the keyboard is integrated besides the "space" key. The operation of this roller can be made to simulate fairly closely the rolling movement of the mouse ball, however, this requires some special operator training. Additionally, this system of course does take up some area of the keyboard.

Finally, a design exists where one key has been replaced with a special pressure sensitive key. Pressing a corner of this key will simulate the operation of the mouse ball. Again, this system requires some training of the operator, and it does take up some area of the keyboard top.

SUMMARY OF THE INVENTION

It is an object of this invention to allow an integration of one or more mouse systems of type 2 into the keyboard, without reducing the top area available for the keys.

According to the invention, a computer keyboard is provided having a front wall and side walls and wherein at least one mouse system is integrated in at least one of the front or side walls of the keyboard.

BRIEF DESCRIPTION OF THE DRAWING

FIG. 6 is a partial perspective view of the computer keyboard having a mouse assembly mounted on a front wall thereof in accordance with the invention;

FIG. 7 is a partial side view of the mouse assembly on the front wall of a keyboard as shown in FIG. 6;

FIG. 8 is a top view of a keyboard with a mouse assembly mounted at each side wall according to the invention in a second embodiment;

FIG. 9 is a top view of a keyboard having two mouse assemblies mounted at the front wall according to the invention in a third embodiment;

DESCRIPTION OF THE PREFERRED EMBODIMENTS

Figure 1:
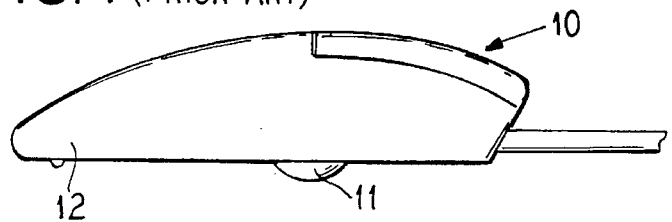
FIG. 1 is a side view of a prior art mouse system of a so-called "type 1" wherein the ball is on the bottom of a housing of the mouse system.
Figure 2:
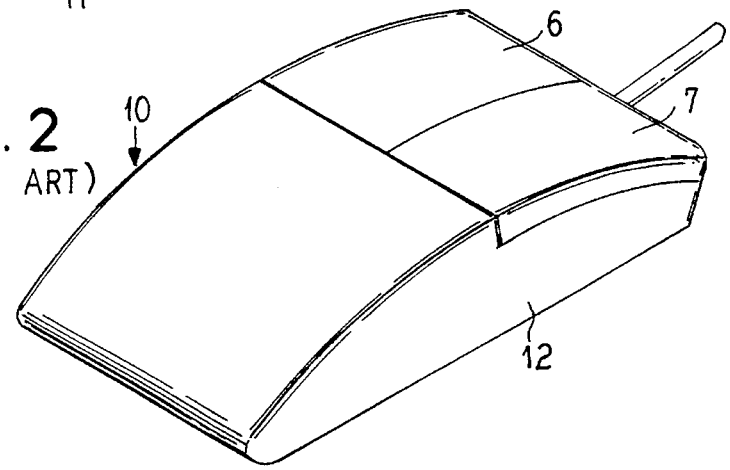
FIG. 2 is a perspective view of the mouse system shown in FIG. 1.
Figure 3:
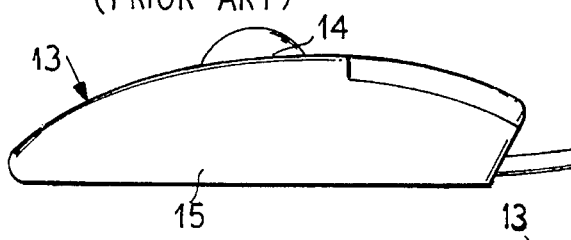
FIG. 3 is a side view of a so-called "type 2" prior art mouse system where the roller ball is on a top of the housing of the mouse system.
Figure 4:
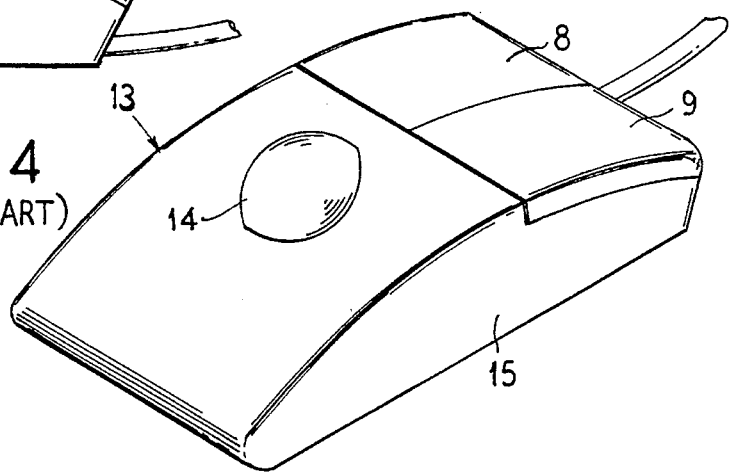
FIG. 4 is a perspective view of the type 2 mouse system shown in FIG. 3.
Figure 5:
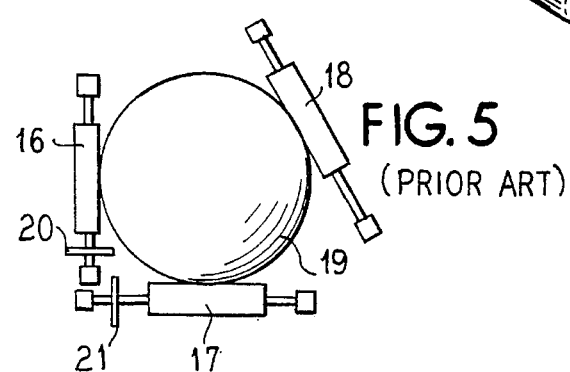
FIG. 5 is a side schematic illustration of internal rollers in contact with a ball of a mouse system according to the prior art.

With the invention as shown in FIG. 6, a front wall or skirt 23 of a keyboard 22 has a mouse 24 of type 2 integrated therein. A mouse 25 or 26 may be integrated on each vertical side wall 28 or 29 of the keyboard 27 as shown in FIG. 8. FIG. 9 shows another embodiment where two mice 30 and 31 are integrated on the front wall 33 of the keyboard 32. Obviously, it is also possible to combine these embodiments.

Figure 10:
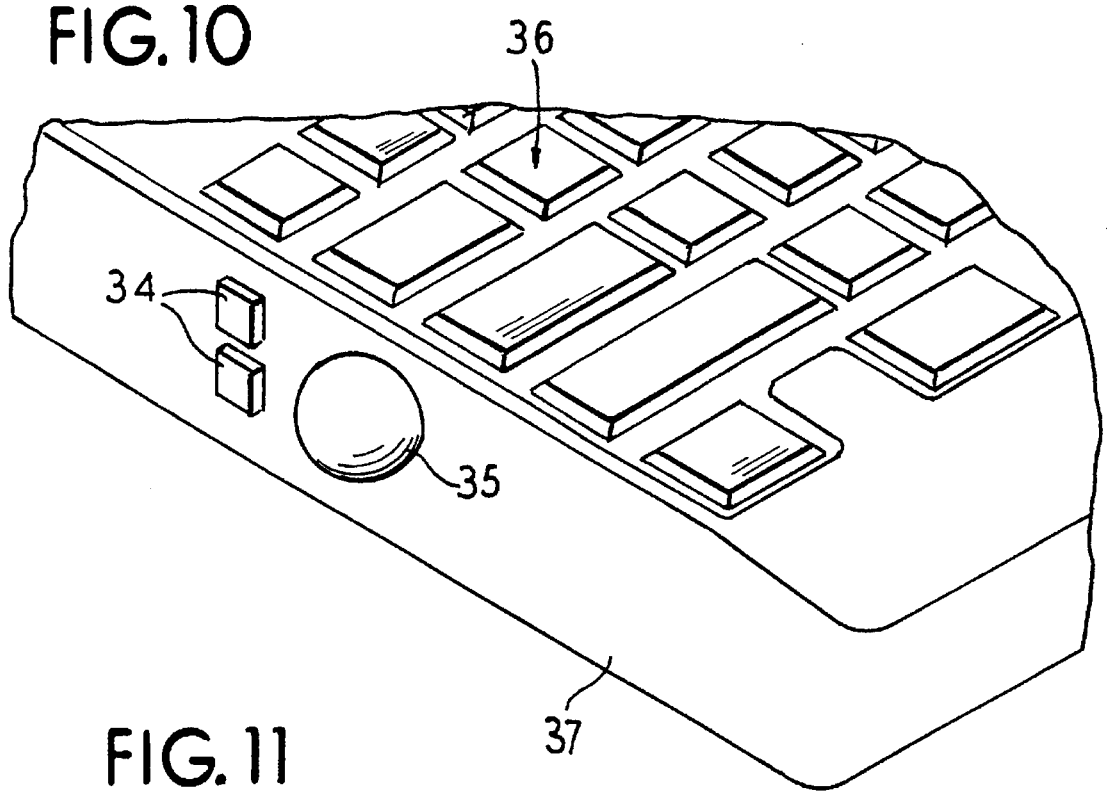
FIG. 10 is a perspective partial view of a keyboard having a mouse assembly with adjacent mouse control keys on a front wall of a keyboard according to a fourth embodiment of the invention.

These mouse systems described above are constructed in principle in the same way as a normal mouse, as previously described, except that the mouse ball itself is normally smaller than those used on standard mouse systems. The mice can be designed with just the ball(s). Some specific keys on the keyboard (such as shown at 100, 101 in FIG. 6) are then programmed to act as control keys as a replacement for the mouse control keys. Also, in another embodiment, the mouse control keys 34 are integrated together with the mouse ball 35 on the keyboard front wall (or side wall) 37 of the keyboard 36. This is shown in FIG. 10.

Figure 11:
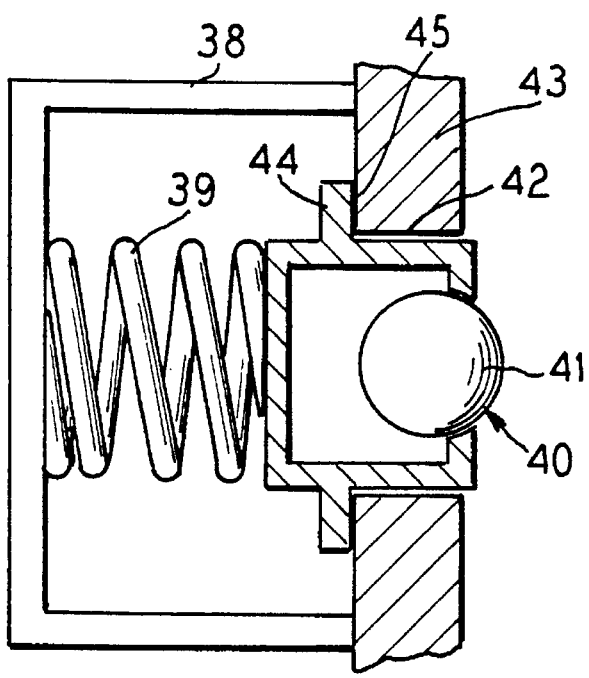
FIG. 11 is a cross-sectional view of a mouse assembly of the mouse system according to the invention installed on a front wall of a keyboard and showing an embodiment wherein the mouse assembly is protected against damage by inadvert inwardly directed forces applied to the mouse assembly from outside the front wall of the keyboard.

As this integrated mouse system is normally used on keyboards and computers designed to be easily carried around, it is very important that the design can take the shocks and hits which these computer systems typically are exposed to. To avoid damaging the mouse when the computer is carried around, the entire mouse system should be designed to be flexible so that high pressure against the ball or the mouse keys (if used) will just force the whole mouse assembly deeper into the keyboard side without being damaged. This is achieved by mounting a mouse housing 38 with a spring 39 so that a mouse assembly 40 is normally pressed outward as shown in FIG. 11. High pressure on the ball 41 of the assembly 40 will just move the whole assembly 40 inwardly. Preferably, the mouse assembly 40, which is received in an aperture 42 of a front wall 43 (or side wall) of the keyboard, has an outwardly extending flange portion 44 which abuts against an inner side edge 45 of the aperture 42 as a result of the spring force imparted by spring 39.

Although various minor changes and modifications might be proposed by those skilled in the art, it will be understood that I wish to include within the claims of the patent warranted hereon all such changes and modifications as reasonably come within my contribution to the art.

I claim as my invention:

1. A keyboard mouse system, comprising:

a keyboard having a keyboard surface with a plurality of keys therein and having a substantially vertical side wall at both opposite vertical sides of the keyboard;

a mouse assembly having a mouse roller ball and an associated control key adjacent thereto integrally mounted in an aperture of each of the vertical side walls such that the ball protrudes outwardly from an outer surface of the respective side wall and with a remainder of the ball being inwardly of an outer surface of the side wall; and the roller ball being retained in a ball retaining member which projects through an aperture in each of the side walls, a spring means being provided for biasing the ball retaining member outwardly, and stop means for maintaining the ball retaining member and a major portion of the retained ball inwardly of the outer surface of the respective side wall.

2. A computer keyboard mouse system, comprising:

a computer keyboard having a substantially horizontal keyboard surface with a plurality of keys therein and having a side wall at each opposite side of the keyboard:

a mouse assembly having a roller ball and an associated control key adjacent thereto integrally mounted in each of the side walls such that the ball protrudes outwardly from an outer surface of the respective side wall with a remainder of the ball being inwardly of an outer surface of the respective side wall, and including means for retaining the roller ball inwardly of the outer surface; and the roller ball being retained in a ball retaining member which projects through an aperture in each of the side walls, and wherein a spring means is provided for biasing the ball retaining member outwardly.

3. A system according to claim 2 wherein the ball retaining member has stop means for abutting against a back side edge of the side wall at the aperture.

* * * * *